Figure 1:
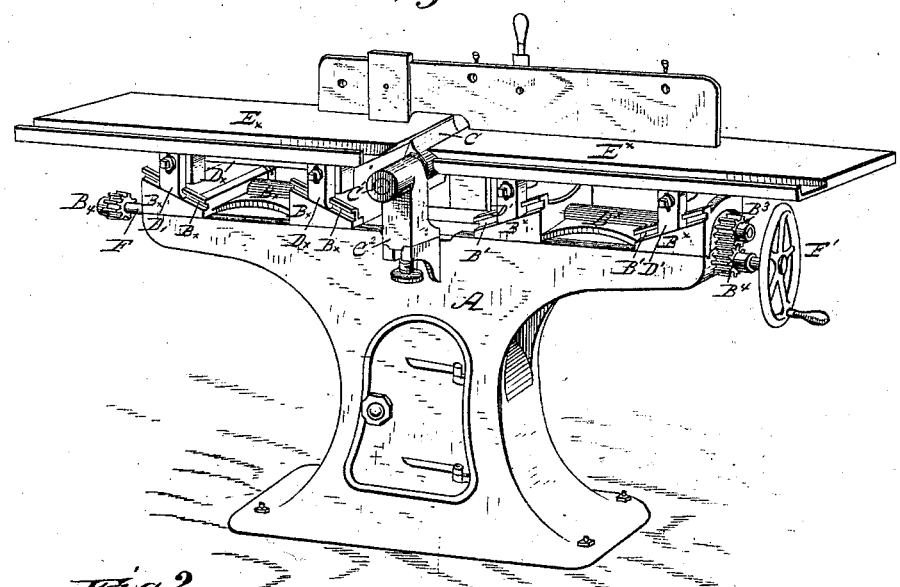

3 Sheets—Sheet 1.

W. H. DOANE, G. W. PASSEL, & G. W. BUGBEE.
Variety Wood-Workers.

No. 227,223. Patented May 4, 1880.

3 Sheets—Sheet 2.
W. H. DOANE, G. W. PASSEL, & G. W. BUGBEE.
Variety Wood-Workers.
No. 227,223. Patented May 4, 1880.
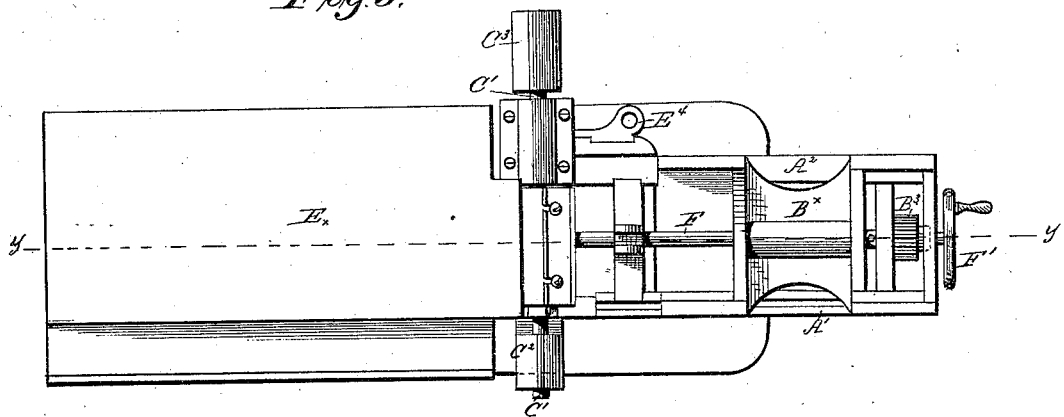
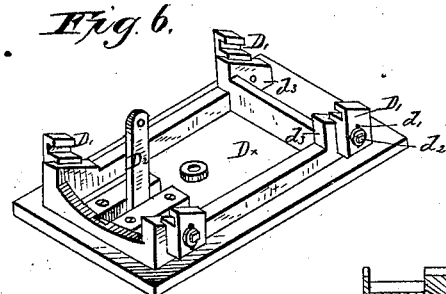
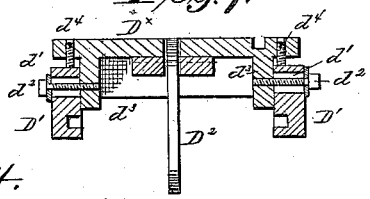
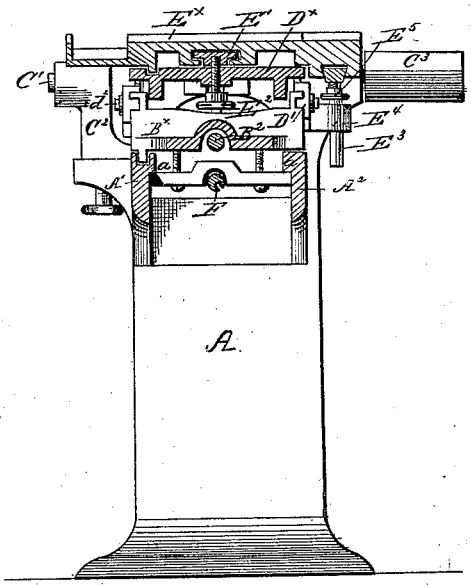
Witnesses.
Franck L. Ourand
Chas. A. Neale
Inventors
William H. Doane
George W. Passel
George W. Bugbee
by their attorney 3 Sheets—Sheet 3.

W. H. DOANE, G. W. PASSEL, & G. W. BUGBEE.
Variety Wood-Workers.

No. 227,223. Patented May 4, 1880.

Witnesses.

Inventors
William H. Doane
George W. Passel
George W. Bugbee
by their attorney

UNITED STATES PATENT OFFICE.

WILLIAM H. DOANE, GEORGE W. PASSEL, AND GEORGE W. BUGBEE, OF CINCINNATI, OHIO, ASSIGNORS TO J. A. FAY & CO., OF SAME PLACE.

VARIETY WOOD-WORKER.

SPECIFICATION forming part of Letters Patent No. 227,223, dated May 4, 1880.

Application filed January 20, 1880.

*To all whom it may concern:*

Be it known that we, WILLIAM H. DOANE, GEORGE W. PASSEL, and GEORGE W. BUGBEE, residing in Cincinnati, in the county of Hamilton and State of Ohio, have invented certain new and useful Improvements in Variety Wood-Workers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to wood-working machines known in the market under the name of "variety wood-workers," from the fact that a great variety of work can be performed with said machines—as, for instance, planing, mitering, tenoning, panel-raising, &c. These machines are constructed with a transverse spindle or shaft carrying the cutter-head, and with two tables, one arranged in front of the cutter-head and the other in rear of the cutter-head. The cutter-head shaft is generally fixed, and the tables are associated with means for adjusting them with respect to the cutter-head as the particular style of work to be done may require.

Respecting the adjustments of the tables, among other conditions the following arise, namely: (a) that the front table only requires adjustment; (b) that the rear table only requires adjustment; (c) that both tables require to be adjusted without change in their relative horizontal planes. As these machines have been constructed heretofore each table could be adjusted separately; but there was no means provided for a conjoint adjustment. This construction caused considerable inconvenience and loss of time in making the several adjustments alluded to—first, because to adjust the rear table the operator had to step from the front or working end of the machine to the rear end thereof, and, secondly, because the adjustment specified under (c) required two separate operations, and also involved adjustment of the tables with respect to each other.

One object of this invention is to construct the machine in such a manner that the tables can be adjusted separately or conjointly, as may be required.

Another object of this invention is to construct the machine in such a manner that the tables can be adjusted from the working end of the machine.

The invention also contemplates the accomplishments, at the will of the operator, of a simple vertical adjustment of either table and a compound vertical and horizontal adjustment thereof, also the leveling of the tables.

To these ends the invention consists of various combinations set forth in the claims at the close of this specification, and made up out of mechanical devices, of which the following are the principal: two tables arranged in front and in rear of the cutter-head, respectively, for the support of the work in feeding it over the cutter-head; a leading-shaft, or its equivalent, adapted to operate the respective adjusting devices of the tables either separately or conjointly; a slide under each table, adapted to effect vertical adjustments thereof; a carrier interposed between the table and the slide, and connected with the main frame as well as with the slide, so that the vertical movements of the carrier effected by the slide will be accompanied by horizontal movements of such carrier; a clamp or other suitable means for securing the table to its carrier when required, so that then the table will partake of the compound horizontal and vertical movement of the carrier at times of adjustment; a vertical guide-rod fitted in a fixed guide on the main frame, and adapted to be secured to the table to insure vertical movement of such table at times of adjustment when it is free from its carrier.

Sundry minor devices, hereinafter more particularly described, are also used to make up some of the combinations claimed.

In order that the invention may be fully understood we have illustrated in the annexed drawings and will proceed to describe the best form of the invention so far devised by us.

It should be understood, however, that our invention is not confined to this particular embodiment of it, and that many modifications (and some modifications will be alluded to hereinafter) may be made in the details of construction without evading the principle of the invention.

Figure 2:
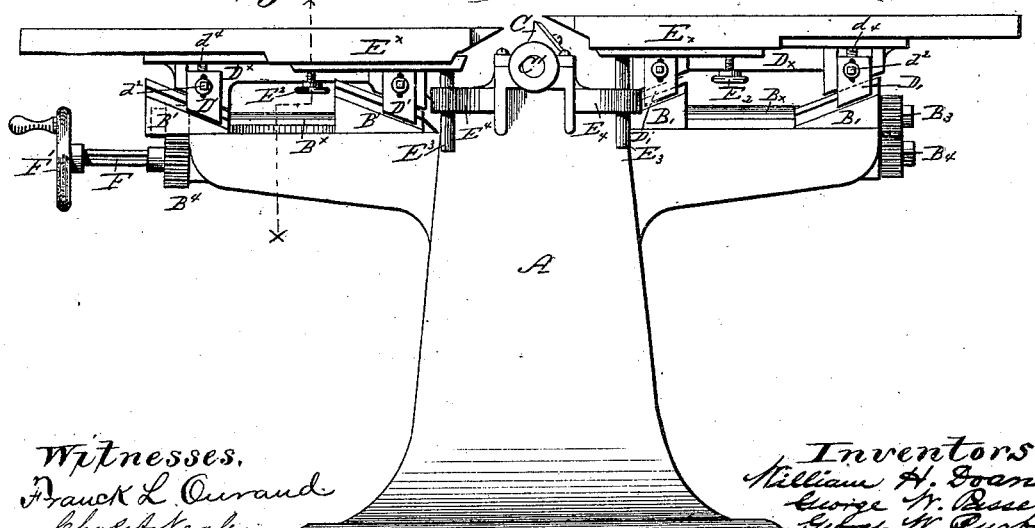
Figure 5:
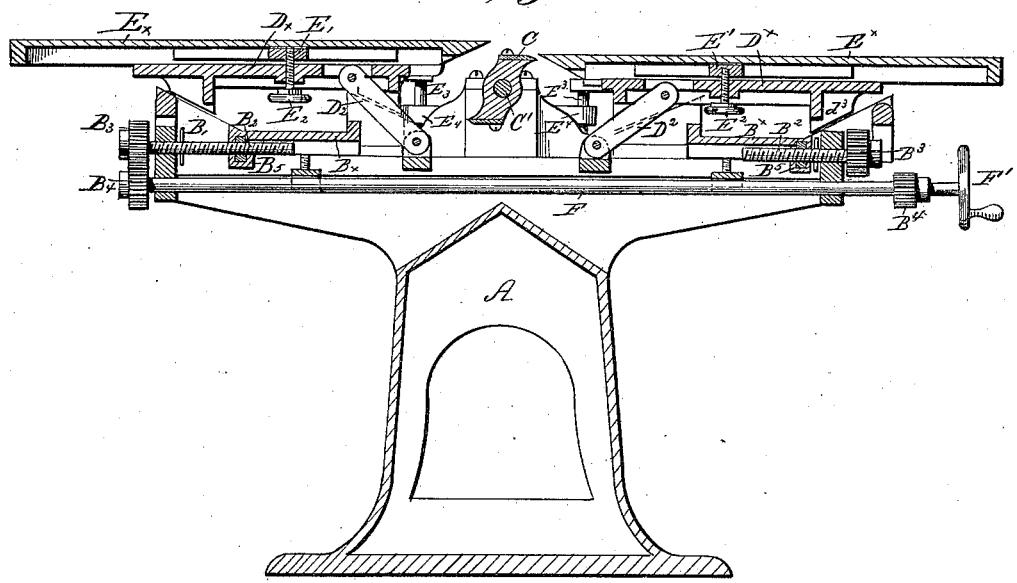
Figure 8:
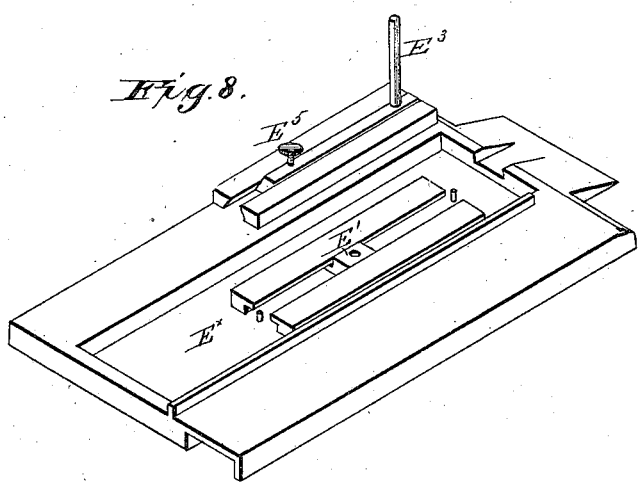

Figure 1 is a perspective view of the improved machine. Fig. 2 is a rear side elevation of the same. Fig. 3 is a plan view of the machine as it appears after the removal of the front table and its carrier. Fig. 4 is a transverse section in the planes indicated by the broken lines $x\,x$, Fig. 2, and looking toward the rear end of the machine. Fig. 5 is a vertical longitudinal section in the plane indicated by the broken line $y\,y$, Fig. 3, and looking toward the rear side of the machine. Fig. 6 is a perspective view of one of the carriers turned upside down. Fig. 7 is a transverse section of one of the carriers. Fig. 8 is a perspective view of the front table turned upside down.

The same letters of reference are used in all the figures in the designation of like parts, and corresponding parts on opposite ends of the machine are designated by the same but differently-indexed letters.

The column or main frame A is at the top constructed with two parallel horizontal bars, $A^1$ and $A^2$, forming the ways upon which the slides $B^\times$ and $B_\times$ move.

The cutter-head C is fixed on the cross-shaft $C^1$, which turns in bearings, of which the one at the front side of the machine and marked $C^2$ is axially removable in order to afford the facility of removing the cutter-head and substituting for it one of a different style whenever the nature of the work requires such change. The overhanging rear end of the shaft $C^1$ is provided with a pulley, $C^3$, for driving it.

The slide $B^\times$ is mounted upon the right-hand ends of the ways $A^1$ and $A^2$, in front of the cutter-head, while the slide $B_\times$ is mounted on the left-hand ends of said ways, in rear of the cutter-head. The slides are so connected to the ways that they can only move horizontally in longitudinal directions, and each slide is provided with a cross-head, engaging with its ends under rails or guides $a$, on the inner sides of the ways $A^1$ and $A^2$, as best seen in Fig. 4, to hold the slides down on their ways. The slide $B^\times$ supports the front table, $E^\times$, by means of the interposed platform or carrier $D^\times$, while the slide $B_\times$ supports the rear table, $E_\times$, by means of the interposed platform or carrier $D_\times$.

With certain exceptions, hereinafter duly set forth, the construction and arrangement of the slide, carrier, and table at the front end of the machine are like the construction and arrangement of the same parts at the rear end of the machine, so that a detailed description of these parts at one end of the machine will be sufficient for an understanding of both sets, to further facilitate which the corresponding devices of the two sets are designated alike in the drawings, except that the letters of reference used for one set have their indices at the top, while the same letters of reference used for the other set have their indices at the bottom.

The carrier $D^\times$ is provided on both the front side and the rear side with a pair of feet, $D^1\,D^1$, which interlock or engage with inclined guides $B^1\,B^1$ on the slide $B^\times$, so as to preserve a permanent connection between the slide and carrier. The carrier is also connected with the main frame by means of a link, $D^2$, arranged at such an inclination that its end pivoted to the carrier will approach the cutter-head whenever the carrier is elevated, but recede therefrom whenever the carrier is lowered. On moving the slide its inclined guides operate to raise or lower the carrier, as the case may be, and at the same time the link operates to impart an endwise movement to the carrier either toward or away from the cutter-head, as the case may be. The resultant of these two forces is an oblique movement of the carrier, which preserves a constant horizontality.

The table $E^\times$ is supported upon the top of the carrier $D^\times$, said top being, in this instance, in the form of a platform with a longitudinal groove, which is engaged by a longitudinal rail on the bottom of the table. In order that the table may be leveled, the top of the carrier is adjustable on its feet. To this end the feet $D^1$ have each a vertical slot, $d^1$, through which a clamping-screw, $d^2$, passes into a tapped hole in a downward projection, $d^3$, on the bottom of the platform of the carrier $D^\times$. A tapped hole in the top or platform of the carrier, one over each foot, is provided with a sunken screw, $d^4$, the lower end of which rests on the top of said foot. The four corners of the top or platform of the carrier being thus secured to the feet, said top may be adjusted at any corner for the purpose of leveling the superimposed table by first loosening the clamping-screw and then adjusting the sunken screw. After the leveling has been accomplished the clamping-screw should be tightened up.

The table being supported upon the carrier, it follows that any elevation or depression of the carrier due to adjustment of the slide must result in an elevation or depression of the table.

Sometimes it is desirable to adjust the table in a vertical direction only, and at other times it is desirable to adjust the table automatically in vertical and horizontal directions simultaneously, and at still other times it is desirable to adjust the table in a horizontal direction only. To these ends each table is associated with certain instrumentalities, which can be thrown in and out of action, as circumstances may require. Thus table $E^\times$ carries a T-headed nut, $E^1$, in suitable longitudinal guides on its bottom side, which nut is engaged by a thumb-screw, $E^2$, passing up from the carrier $D^\times$. The thumb-screw and nut form a species of clamp, which, by tightening the thumb-screw, operates to secure the table to the carrier, so that the table will then partake of the compound motion of the carrier at times of adjustment. The table $E^\times$ also carries a vertical guide-rod, $E^3$, fitted to move in a vertical guide, $E^4$, formed or fixed on the main frame—at the rear side of the machine in this instance. The guide-rod has a long dovetailed head, carrying a thumb-screw, $E^5$, and fitted in a longitudinal guide on the bottom side of the table. By tightening thumb-screw $E^5$ the guide-rod may be fastened to the table, and in that case the table can be adjusted in a vertical direction only.

In making the several adjustments of the table the clamp and guide-rod are manipulated as follows: To adjust the table in a vertical direction only, the guide-rod is fastened to it and the clamp opened. To adjust it simultaneously in vertical and horizontal directions, the clamp is closed and the guide-rod disconnected from the table. To adjust horizontally only (effected by sliding the table by hand) the clamp must be opened and the guide-rod disconnected from the table. By closing the clamp and fastening the guide-rod to the table, the table, carrier, and slide become virtually locked, so that vibrations cannot affect the adjustment.

The adjustments of the tables, except their simple horizontal adjustments made by hand, are effected by adjustments of the respective slides $B^\times$ and $B_\times$ through the operations of the leading-shaft F on the respective screw-spindles $B^2$ and $B_2$, which turn without longitudinal motion in bearings on the main frame and engage nuts $B^5$ and $B_5$ on the slides.

On reference to the drawings, it will be observed that the guides $B^1$ of slide $B^\times$ incline in a direction reverse to the inclination of the guides $B_1$ of slide $B_\times$. This is not at all essential, and was done merely for the sake of beauty of design; but this construction requires that the slides be moved in opposite directions to effect a simultaneous elevation or depression of the tables. Hence one of the screw-spindles—say $B^2$—has a right-handed screw-thread, while the other one, $B_2$, has a left-handed screw-thread.

The screw-spindles are provided with spur-wheels $B^3$ and $B_3$, respectively, adapted to be engaged by pinions $B^4$ and $B_4$ on the leading-shaft F. The end of the leading-shaft at the working or right-hand end of the machine carries a suitable hand-wheel, $F^1$, by which to operate it.

The pinion $B_4$ is permanently fixed on the rear end of the leading-shaft, and in order that it may be thrown out of gear and in gear with wheel $B_3$ from the working end of the machine, the leading-shaft is so arranged that it can be slid endwise in its bearings on the main frame.

The pinion $B^4$ is connected to the leading-shaft by feather and groove, so that it can be shifted thereon to be thrown out of gear or in gear with wheel $B^3$ irrespective of the position of pinion $B_4$ at the time.

In changing from one kind of work to a different kind of work, the tables may require primary adjustments, necessitating changes in the conditions of the respective clamps and guide-rods of the tables, to accomplish which for the rear table the operator would be obliged to step from his position at the working or right-hand end of the machine; but the great majority of the adjustments of the tables can be effected by appropriate operations of the leading-shaft from the working or right-hand end of the machine. Another advantage of the use of the leading-shaft is, that both tables can be simultaneously adjusted.

As the invention relates to a well-known class of wood-working machines, it is deemed unnecessary to set forth the various relative positions the tables are required to occupy with respect to each other and to the cutter-head in prosecuting different styles of work. It is believed that the described adjusting devices meet all the requirements far more satisfactorily than the adjusting devices of such machines as heretofore made or known.

Many changes may be made in the details of construction without affecting the general operation of the machine. Thus the longitudinal movement of the carriers may be effected by the substitution, in lieu of the links $D^2 D_2$, of inclined guides and pins or projections moving therein. The vertical guide-rods may be permanent parts of the tables, and the guides thereof sliding guides, with means for fixing them on the main frame. The pinions $B^4 B_4$ may both be in permanently-fixed positions on the leading-shaft, but with sufficiently long teeth and so arranged, however, that by appropriate endwise adjustments of the leading-shaft either pinion, or both pinions simultaneously, may be thrown in gear with the wheels $B^3$ and $B_3$, respectively. Both pinions $B^4$ and $B_4$ might, on the other hand, be made shiftable on the leading-shaft, and a shifter extend from the pinion $B_4$ to a point within convenient reach from the working end of the machine. The leading-shaft and screw-spindles might constitute a single long rod, in which case the gear-wheels would be dispensed with, and the nuts $B^5$ and $B_5$ might be made in sections, arranged to open and close to engage or disengage the screw-threads of the adjusting-shaft.

Other modifications of the leading-shaft and its adjuncts, or equivalents for a leading-shaft, will readily suggest themselves to a mechanic skilled in these matters.

We believe ourselves to be the first to provide a wood-working machine of the described class with means for effecting both separate and simultaneous adjustments of the tables from the working end of the machine; and the essential feature of said means is a leading-shaft, or its equivalent, to operate on the tables through suitable connecting mechanism, which connecting mechanism may be changed at will to suit different styles of machines or the views of manufacturers or users.

What we claim as our invention, and desire to secure by Letters Patent, is—

1. The combination, substantially as before set forth, of the two tables arranged in front and in rear of the cutter-head, respectively, and the leading-shaft or its equivalent for adjusting the tables with respect to the cutter-head through suitable connecting mechanism, either separately or conjointly at pleasure, from the working end of the machine.

2. The combination, substantially as before set forth, of the two tables arranged in front and in rear of the cutter-head, respectively, the two slides, their screw-spindles provided with gear-wheels, and the leading-shaft carrying corresponding gear-wheels adapted to be thrown in and out of gear.

3. The combination, substantially as before set forth, of the two tables arranged in front and in rear of the cutter-head, respectively, the two slides, their screw-spindles provided with gear-wheels, and the endwise-adjustable leading-shaft carrying corresponding gear-wheels.

4. The combination, substantially as before set forth, of the two tables arranged in front and in rear of the cutter-head, respectively, the two slides, their screw-spindles provided with gear-wheels, and the endwise-adjustable leading-shaft carrying corresponding gear-wheels, one of which is shiftable.

5. The combination, substantially as before set forth, of the slide and the carrier resting upon the slide and connected to the main frame, whereby the movement of the slide effects a compound vertical and horizontal adjustment of the carrier.

6. The combination, substantially as before set forth, of the slide provided with inclined guides, and the carrier interlocked with said guides, and also connected with the main frame.

7. The combination, substantially as before set forth, of the slide provided with inclined guides, the carrier interlocked with said guides, and the link for connecting the carrier to the main frame.

8. The combination, substantially as before set forth, of the slide, the carrier connected with the slide as well as with the main frame, the table, and means for connecting and disconnecting the table and carrier at pleasure.

9. The combination, substantially as before set forth, of the slide, the carrier connected with the slide as well as with the main frame, the table, and the clamping-nut and screw for connecting and disconnecting the table and carrier at pleasure.

10. The combination, substantially as before set forth, of the slide provided with inclined guides, the carrier interlocked with said guides, the link for connecting the carrier to the main frame, the table, and the clamping-nut and screw for connecting and disconnecting the table and carrier at pleasure.

11. The combination, substantially as before set forth, of the adjustably-mounted table and the independent vertical guide-rod thereof, which can be fastened thereto and disconnected therefrom at pleasure.

12. The combination, substantially as before set forth, of the slide, the carrier connected with the slide as well as with the main frame, the table, and the vertical guide-rod of the table.

13. The combination, substantially as before set forth, of the slide, the carrier connected with the slide as well as with the main frame, means, substantially as described, for connecting and disconnecting the table and carrier at pleasure, and the vertical guide-rod, which can be fastened to and disconnected from the table at pleasure.

14. The combination, substantially as before set forth, of the slide having inclined guides, the carrier interlocked with said guides, the link for connecting the carrier to the main frame, the table, the clamping-nut and screw for connecting and disconnecting the table and carrier at pleasure, and the vertical guide-rod, which can be fastened to and disconnected from the table at pleasure.

15. The combination, substantially as before set forth, of the table and the top or platform of the carrier having separate adjustments at the corners for leveling the superincumbent table.

In testimony that we claim the foregoing we have hereunto set our hands this 3d day of January, 1880.

WM. H. DOANE.
    GEO. W. PASSEL.
    G. W. BUGBEE.

Witnesses:
 EDWARD GURNEY,
 WILLIAM GUTHARDT.